US010949953B2

(12) United States Patent
Lin et al.

(10) Patent No.: US 10,949,953 B2
(45) Date of Patent: Mar. 16, 2021

(54) DIRECTIONAL BILATERAL FILTERING OF RAW IMAGE DATA

(71) Applicant: Apple Inc., Cupertino, CA (US)

(72) Inventors: Sheng Lin, San Jose, CA (US); David R. Pope, Fremont, CA (US)

(73) Assignee: APPLE INC., Cupertino, CA (US)

( * ) Notice: Subject to any disclaimer, the term of this patent is extended or adjusted under 35 U.S.C. 154(b) by 205 days.

(21) Appl. No.: 16/352,801

(22) Filed: Mar. 13, 2019

(65) Prior Publication Data

US 2020/0294199 A1 Sep. 17, 2020

(51) Int. Cl.
*G06K 9/40* (2006.01)
*G06T 5/00* (2006.01)
*G06T 3/40* (2006.01)

(52) U.S. Cl.
CPC ............ *G06T 5/002* (2013.01); *G06T 3/4015* (2013.01); *G06T 2207/10024* (2013.01); *G06T 2207/20028* (2013.01)

(58) Field of Classification Search
CPC .................. G06T 5/002; G06T 3/4015; G06T 2207/20028; G06T 2207/10024; G06T 2200/28
USPC ......................................................... 382/275
See application file for complete search history.

(56) References Cited

U.S. PATENT DOCUMENTS

| 6,816,197 | B2 | 11/2004 | Keshet et al. |
| 9,582,853 | B1 | 2/2017 | Oh et al. |
| 9,619,862 | B2 | 4/2017 | Zimmer |
| 2012/0195518 | A1* | 8/2012 | Chen .................. H04N 5/23229 382/254 |
| 2015/0022869 | A1* | 1/2015 | Shi ...................... H04N 1/40012 358/482 |
| 2017/0039682 | A1* | 2/2017 | Oh ......................... G06T 3/4015 |
| 2017/0278224 | A1 | 9/2017 | Onzon et al. |

* cited by examiner

*Primary Examiner* — Andrew M Moyer
(74) *Attorney, Agent, or Firm* — Fenwick & West LLP

(57) ABSTRACT

Embodiments relate to directional bilateral filtering of a raw image. For each pixel in the image, a block of pixels surrounding that pixel is used for filtering. When the block of pixels in a Bayer pattern have directionality, directional filter coefficients are used instead of default filter coefficients. To obtain a directional tap, a directional filter coefficient is attenuated by an attenuation factor that differs based at least on the location of the pixels in the pixel block. The directional taps are blended with non-directional taps derived from the default filter coefficients using a weight representing confidence on the directionality. The filtered pixel values are then obtained by multiplying pixel values with corresponding taps.

20 Claims, 9 Drawing Sheets

| R P(1,1) | GR P(1,2) | R P(1,3) | GR P(1,4) | R P(1,5) |
|---|---|---|---|---|
| GB P(2,1) | B P(2,2) | GB P(2,3) | B P(2,4) | GB P(2,5) |
| R P(3,1) | GR P(3,2) | R P(3,3) | GR P(3,4) | R P(3,5) |
| GB P(4,1) | B P(4,2) | GB P(4,3) | B P(4,4) | GB P(4,5) |
| R P(5,1) | GR P(5,2) | R P(5,3) | GR P(5,4) | R P(5,5) |

*FIG. 6*

DIRECTIONAL BILATERAL FILTERING OF RAW IMAGE DATA

BACKGROUND

1. Field of the Disclosure

The present disclosure relates a circuit for processing images and more specifically to performing directional bilateral filtering on raw images of Bayer format.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Image sensors generally capture images in Bayer pattern (also called as "raw images") where each pixel is one of red, green and blue color. Such images in Bayer pattern are then demosiaced to obtain full colored images where each pixel has multiple color components (e.g., red, green and blue). However, noise in the raw images may lead to artifacts in a demosaicing process. Hence, it is advantageous to perform operations to remove noise from the raw images before demosaicing them.

SUMMARY

Embodiments relate to performing bilateral filtering on a raw image based on directionality. For each pixel in the image, a block of pixels surrounding that pixel is used in the filtering process. It is determined whether the block of pixels in the raw image has directionality. If the block of pixels has directionality, taps for pixels of the same color as the center pixel in the block are determined by processing directional filter coefficients corresponding to the directionality and the location of each pixel within the block. Filtered pixel values in a filtered raw image are obtained by multiplying the taps to corresponding pixel values in pixels of the same color as the center pixel in the block and adding the multiplied values. Demosaicing is subsequently performed on a version of the filtered raw image.

BRIEF DESCRIPTION OF THE DRAWINGS

FIG. 6 is a diagram illustrating a block of pixels in Bayer pattern, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to directional bilateral filtering of a raw image. For each pixel in the raw image, a block of pixels surrounding the pixel is used for filtering. When the block of pixels in a Bayer pattern have directionality, directional filter coefficients are used instead of default filter coefficients. To obtain a directional tap, a directional filter coefficient is attenuated by an attenuation factor that differs based at least on the location of the pixels in the pixel block and the pixel value difference. The directional taps are blended with non-directional taps derived from the default filter coefficients using a weight representing confidence on the directionality. The filtered pixel values are then obtained by multiplying pixel values with corresponding taps.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
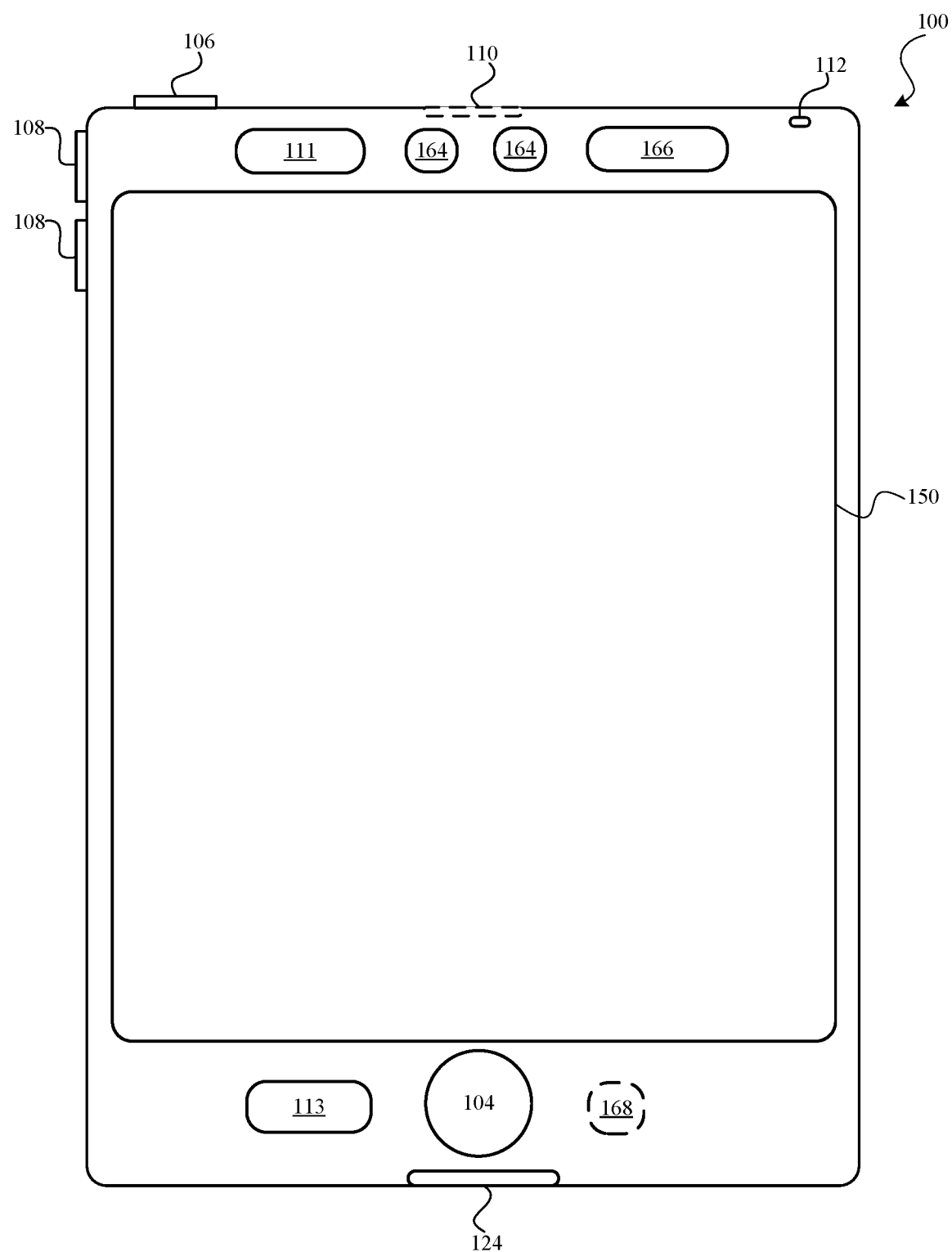
FIG. 1 is a high-level diagram of an electronic device, according to one embodiment

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
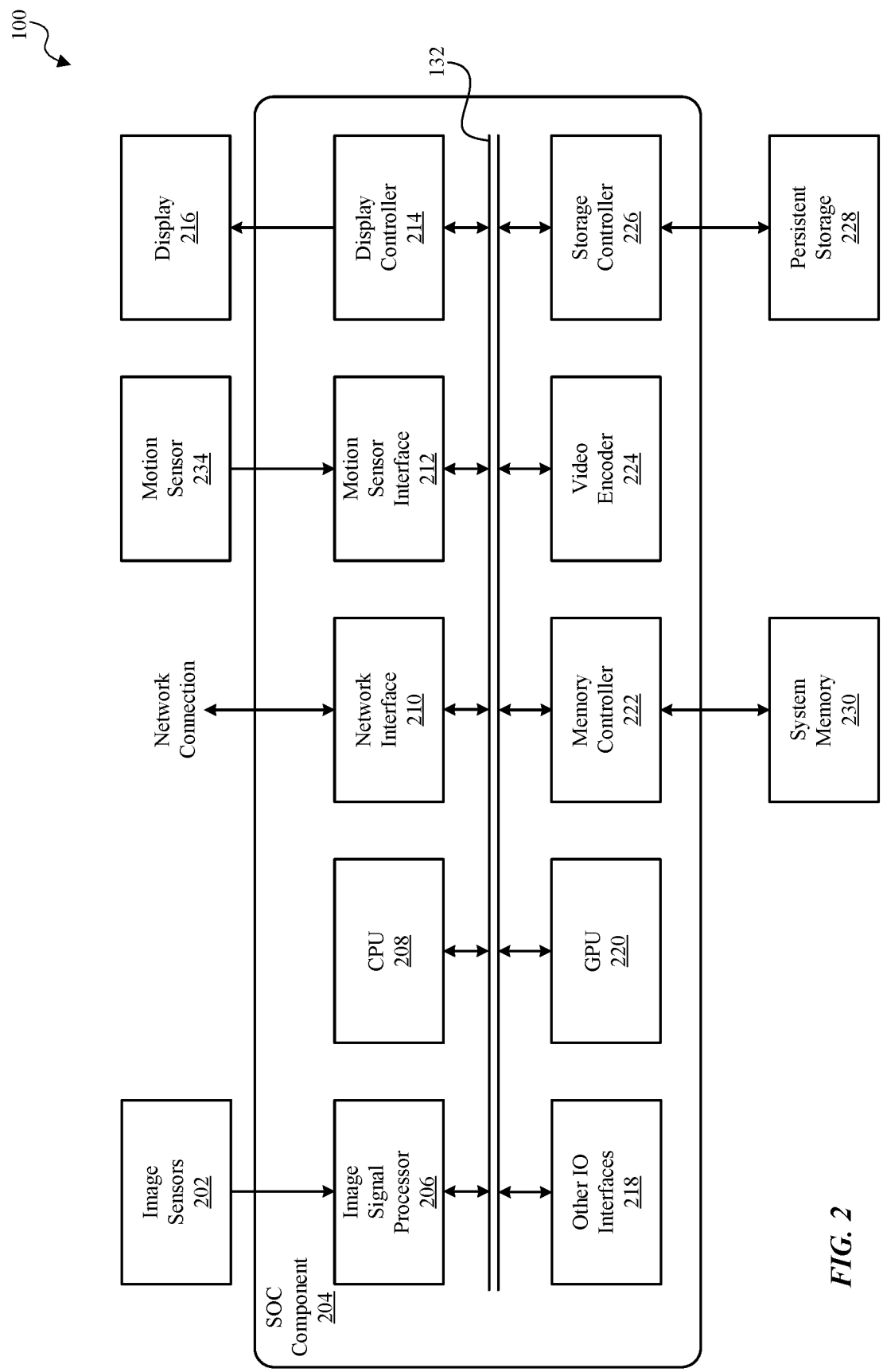
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
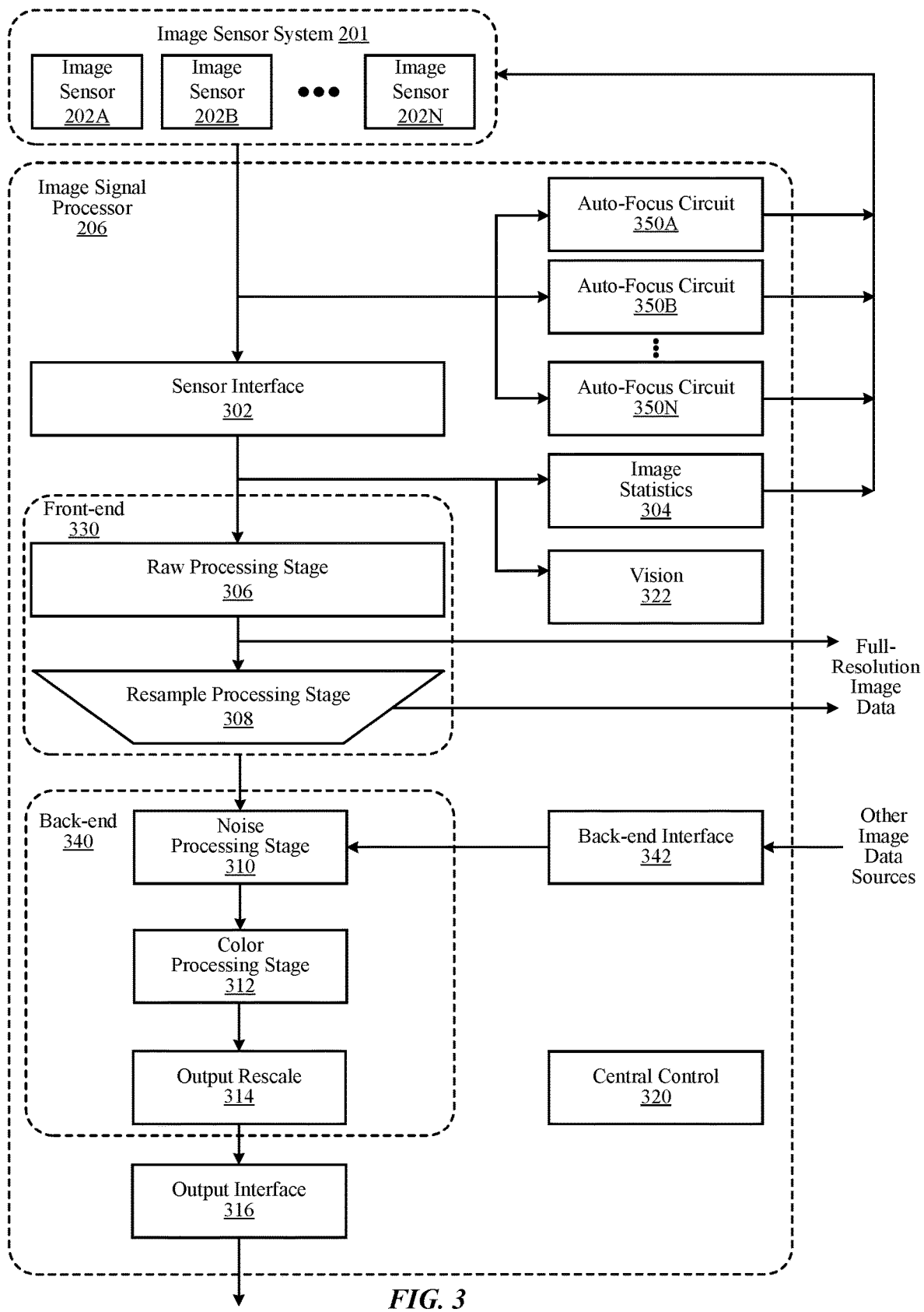
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a drop-off in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCbCr format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Front-End Pipeline Stages

Figure 4:
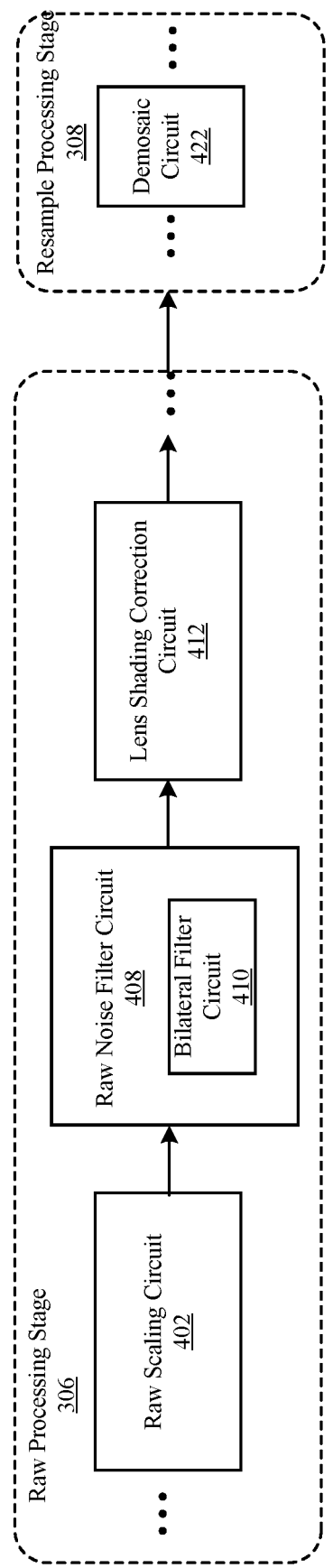
FIG. 4 is a block diagram illustrating front-end pipeline stages in the image signal processor, according to one embodiment.

FIG. 4 is a block diagram illustrating front-end pipeline stages 330 in image signal processor 206, according to one embodiment. The front-end pipeline stages 330 include a raw processing stage 306 and a resample processing stage 308. The raw processing stage 306 may include, among other components, a raw scaling circuit 402, a raw noise filter circuit 408 and a lens shading correction circuit 412. In the example of FIG. 4, a raw image is scaled by raw scaling circuit 402, processed by the raw noise filter circuit 408, and then sent to lens shading correction circuit 412 that applies a gain per pixel to compensate for decrease in intensity of light with increasing the distance from an optical center of the lens in image sensor 202.

The raw image may be further processed after correction by lens shading correction circuit 412 before being sent to resample processing stage 308 or be fed directly from lens shading correction circuit 412 to resample processing stage 308. The resample processing stage 308 may include, among other components, a demosaic circuit 422 that processes an enhanced version of the raw image from raw processing state 360 in Bayer pattern into a full color image where each pixel includes multiple color components (e.g., red, green, blue). The full color image generated by the demosaic circuit 422 is then fed to subsequent pipelines such as back-end noise processing stage 310.

Raw noise filter circuit 408 is a circuit that performs noise reduction in the raw image. Raw noise filter circuit 408 may include bilateral filter circuit 410 in addition to other filtering circuits. These additional filtering circuits may be placed upstream or downstream of bilateral filter circuit 410 within raw noise filter circuit 408.

The arrangement of stages and their component circuits in FIG. 4 are merely illustrative. Additional component circuits and/or stages may be added to the example of FIG. 4. The sequence of processing may also be reversed. For example, lens shade correction may be performed before raw noise filtering.

Example Bilateral Filter Circuit

Figure 5:
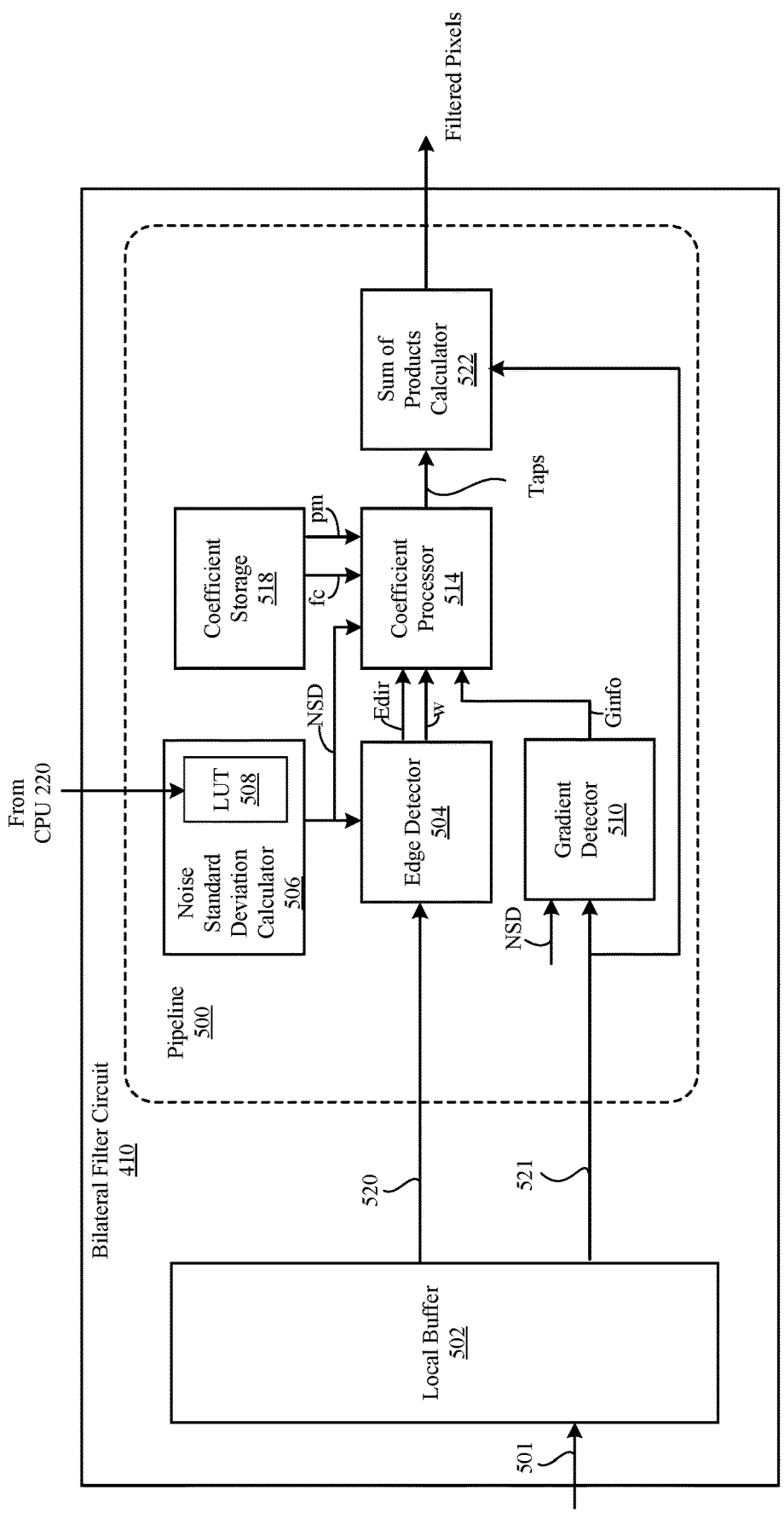
FIG. 5 is a block diagram illustrating a bilateral filter circuit in the raw noise filter circuit of FIG. 4, according to one embodiment.

FIG. 5 is a block diagram illustrating bilateral filter circuit 410 in the raw noise filter circuit 408 of FIG. 4, according to one embodiment. Bilateral filter circuit 410 performs bilateral filtering of raw image 501 in Bayer pattern. Raw image 501 may already have undergone processing by other filtering circuits or image enhancement process before being fed to bilateral filter circuit 410. Bilateral filter circuit 410 may include, among other components, local buffer 502 and a pipeline 500. Pipelines 500 processes pixels of a single color channel using surrounding pixels of the same color for filtering and surrounding pixels 520 of all colors for detecting the edge. Although FIG. 5 illustrates only a single pipeline 500, multiple pipelines may be processed so that pixels of multiple color channels are processed in parallel.

The local buffer 502 is a circuit for temporarily storing pixels of raw image for access by the pipelines 500.

Pipeline 500 performs bilateral filtering for a center pixel using surrounding pixels of all color to detect direction of an edge and then using surrounding pixels of the same color (e.g., one of R, GB, GR and B) according to the detected edge to produce a filtered center pixel. Pipeline 500 may include, among other components, edge detector 504, noise standard deviation calculator 506, gradient detector 510, coefficient processor 514, coefficient storage 518, and sum of product calculator 522. To perform bilateral filtering, pipeline 500 receives pixel values for a block of pixels 520 of all colors as well as pixel vales of a block of pixels 521 of the same color. The size of the pixel block 520 (of all color) may be 5×5 pixels, as described in FIG. 6 while the pixel block 521 (the same color) may be 3×3, as described below with reference to FIG. 7.

Figure 7:
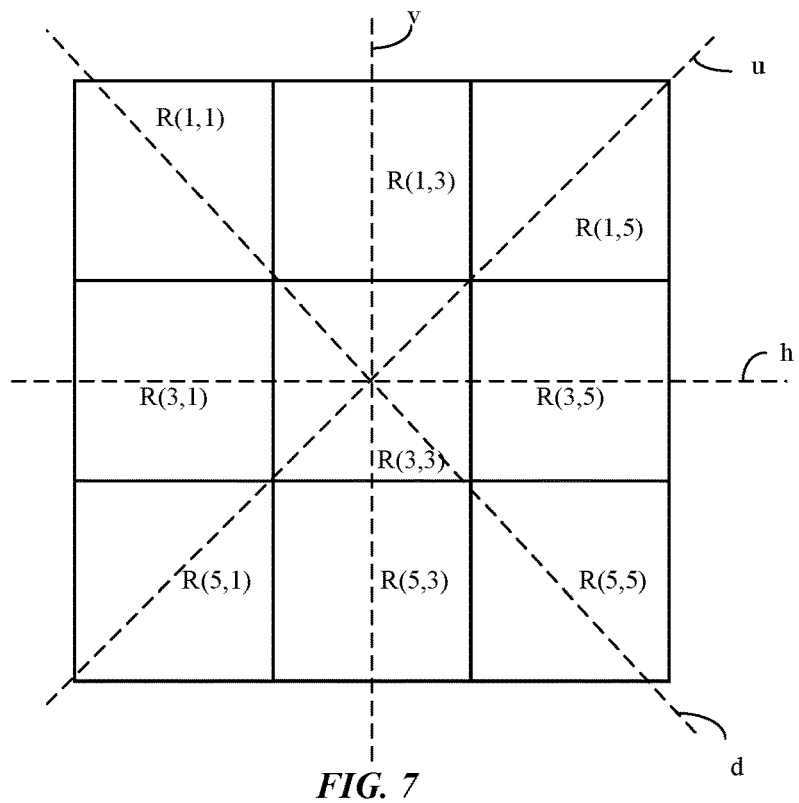
FIG. 7 is a conceptual diagram illustrating possible directionality in red pixels of FIG. 6, according to one embodiment.

Edge detector 504 is a circuit that detects an edge in the block of pixels. In one embodiment, edge detector 504 processes the pixel values of all components in the pixel block to determine the direction of the edge. The direction of the edge may be represented by a vertical edge (v), a horizontal edge (h), an upward diagonal edge (u) or a downward diagonal edge (d), as illustrated in FIG. 7. In one embodiment, edge detector 504 computes the following directional energies Eh, Ev, Eu, Ed, each representing energy along a horizontal direction, a vertical direction, an upward diagonal direction or a downward diagonal direction, respectively, according to following equations:

$$Eh = \{D32\_34 + (D33\_31 + D33\_35 + D22\_24 + D42\_44)/2 + (D23\_21 + D23\_25 + D43\_41 + D43\_45)/4\}/4 \quad (1)$$

$$Ev = \{D23\_43 + (D33\_13 + D33\_53 + D22\_42 + D24\_44)/2 + (D32\_12 + D32\_52 + D34\_14 + D34\_54)/4\}/4 \quad (2)$$

$$Eu = \{D24\_42 + (D33\_15 + D33\_51 + D23\_41 + D43\_25 + D32\_14 + D34\_52)/2\}/4 \quad (3)$$

$$Ed = \{D22\_44 + (D33\_11 + D33\_55 + D23\_45 + D43\_21 + D32\_54 + D34\_12)/2\}/4 \quad (4)$$

where Dij_mn indicates the absolute pixel value difference between pixels P(i,j) and P(m, n) (i, j, m, n are integers from 1 to 5 when 5×5 pixel block is used with P(3, 3) being the center pixel for filtering). Directional energies are then compared to select one with the lowest value. The direction of the energy with the lowest value is represented as edge direction Edir. Edge direction Edir is sent to coefficient processor 514 for processing.

In addition, edge detector 504 also determines a confidence value w indicating the likelihood or confidence that the direction represented by edge direction Edir is actually present in the block (where w has a value between 0 and 1). The confidence value can be determined, for example, by taking into account various factors, including but not limited to, (i) the average of Eh, Ev, Eu, Ed, (ii) the smallest value of the energies, (iii) the energy of the direction perpendicular to the edge direction Edir, and (iv) the average noise standard deviation of four color components (R, $G_B$, $G_R$, B). The confidence value w is also sent to coefficient processor 514.

Gradient detector 510 is a circuit that detects a gradient in the pixels of the same color (e.g., red pixels) and determines whether the pixels are on-gradient. On-gradient means that pixels along a line are on a gradually increasing or decreasing slope below a threshold with no change in a gradient direction. Gradient detection may be optional. Whether a red pixel is on such location or not is determined by comparing pixel value differences along lines (e.g., v, u, h, d lines in FIG. 7). If the difference of the pixel value differences of pixels relative to the center pixel accounted for noise standard deviation value NSD of the center pixel is below a threshold, these pixels are determined to be on locations where the gradient is changing gradually. Taking, for example, pixels R(3,1), R(3,3) and R(3,5) along line h, these three pixels are determined to be on locations with the gradual gradient change if the following two equations are satisfied:

$$(P33-P31)*(P33-P35)<0 \quad (5)$$

$$[\text{abs}\{\text{abs}(P33-P31)-\text{abs}(P33-P35)\}]/NSD<Th \quad (6)$$

where P33, P31 and P35 represents pixel values for R(3,3), R(3,1) and R(3,5), respectively, NSD represents noise standard deviation value for the center pixel R(3,3) and Th represents a threshold value. The same operation is performed for other directions (v, u and d). Then, gradient detector 510 sends gradient information Ginfo indicating which red pixels are at locations that are on gradient.

Noise standard deviation calculator 506 receives and stores noise standard deviation values NSD generated by CPU 220. Noise standard deviation values NSD represent the standard deviation of noise on various pixel brightness levels. These values may be stored in noise standard deviation calculator 506 as a lookup table 508. Noise standard deviation calculator 506 may then perform processing on the NSD values stored in the lookup table 508 to obtain a specific NSD value for a pixel through interpolation. In one embodiment, CPU 220 computes the noise standard deviation values NSD based on how the raw image is captured and processed before being provided to bilateral filter circuit 410. Processing taken into account at CPU 220 for this purpose may include, but is not limited to, sensor integration time, analog gain and digital gains. The stored noise standard deviation values NSD are sent to edge detector 504, gradient detector 510 and coefficient processor 514.

Coefficient storage 518 is memory circuit that stores filter coefficients fc and parameters pm used by coefficient processor 514. Filter coefficients fc include four separate categories: (i) default coefficients used when there is no directionality in the pixel block, (ii) on-edge coefficients used when corresponding pixels are on an edge, (iii) on-gradient coefficients used when the corresponding pixels are not on the edge but on gradient, and (iv) off-edge coefficients used when corresponding pixels are not on the edge nor at on gradient.

Parameters pm include knee values and slope values for determining the attenuation factors at coefficient processor 514. In one embodiment, there are seven combinations of the knee values and the slope values: (i) one combination of default knee value and default slope value used when there is no directionality in the pixel block, (ii) two combinations of on-edge knee values and on-edge slope values used when corresponding pixels are on an edge, (iii) two combinations of on-gradient knee values and on-gradient slope values used when corresponding pixels are not on the edge but at locations where a gradient is present, and (iv) two combinations of off-edge knee values and off-edge slope values used when corresponding pixels are not on the edge nor at locations where the gradient is present. For (ii) through (iv), one combination of knee value and slope value is applicable to red pixels at corners and the other combination of knee value and slope value is applicable to red pixels adjacent to the center red pixel.

Coefficient processor 514 is a circuit that determines taps for multiplying with pixel values at sum of product calculator 522 based on the directionality of pixels in the pixel block by using coefficients fc and parameters pm, noise standard deviation values NSD, gradient information Ginfo, edge direction Edir and confidence value w, as described below in detail. The taps determined for red pixels are then sent to sum of products calculator 522 for multiplication.

Sum of products calculator 522 is a circuit that multiplies the taps receive from the coefficient processor with corresponding red pixel values. Then, sum of products calculator 522 adds the multiplied values and outputs the summed value as a filtered version of a center red pixel.

Although the above explanation was made primarily with reference to a case where the pipeline 500 is performing bilateral filtering on red pixels, the same processes and operations are applicable to cases where pipeline 500 performs filtering on other colors (e.g., Gb, Gr, B).

Example Process at Coefficient Processor

Coefficient processor 514 uses different filter coefficients fc and parameters pm to determine filter taps depending on the confidence value w. If the confidence value w indicates the lowest value (e.g., 0) representing lowest level of confidence in directionality, coefficient processor 514 retrieves default coefficients and multiplies them with corresponding attenuation factors to obtain non-directional taps. The non-directional taps are used as the final taps at sum of products calculator 522.

The default coefficients may differ depending on locations of the pixels in the pixel block. For example, when 3×3 pixels of the same color (e.g., red) are used, there are three different default coefficients, one for the center pixel, another for pixel adjacent to the center pixel, and yet another for pixels at four corners. The attenuation factor is, for example, a value mapped by a curve (defined by a default knee value and a default slope value) to a normalized pixel difference value. The normalized pixel difference value refers to the difference between the center pixel value and the current pixel value divided by the noise standard deviation of the center pixel. There may be only a single set of default slope value and default knee value that are applicable to all locations of the pixels.

If the confidence value w indicates the highest value (e.g., 1) representing that the highest confidence in directionality in the pixel block, then directional taps are used as the final taps. In this scenario, the directional tap for each of the pixels is derived using a filter coefficient, a slope value and a knee value that vary depending on whether the pixel is (i) on an edge, (ii) on gradient, or (iii) neither on the edge nor on the gradient.

First, if a pixel is on the edge as indicated by edge direction Edir, coefficient processor 514 uses an on-edge coefficient from coefficient storage 518 multiplied by an attenuating factor as the directional tap for that pixel. For 3×3 pixels, there are two on-edge coefficients, one for corner pixels and the other for pixels adjacent to the center pixels.

Similarly, there are two different combinations of on-edge knee value and on-edge slope value used for determining the attenuating factors: one combination for corner pixels and the other for pixels adjacent to the center pixels. The attenuation factor is determined, for example, as a value mapped by a curve (defined by an on-edge knee value and an on-edge slope value) to a normalized difference between pixel values. The directional taps for pixels on the edge are determined by multiplying the on-edge coefficients with corresponding attenuation factors obtained from a normalized pixel difference value, an on-edge slope value and an on-edge knee value.

Second, if a pixel is not on an edge but a location that is on gradient, coefficient processor 514 uses an on-gradient coefficient to determine the directional tap for that pixel. As in the case where the pixel is on the edge, there are two different on-gradient coefficients, one for corner pixels and the other for pixels adjacent to the center pixel. Further, an attenuation factor is also determined using a value mapped to a curve (defined by an on-gradient knee value and an on-gradient slope value) to a normalized difference between pixel values. There are also two combinations of on-gradient slope value and on-gradient knee value, one for corner pixels and the other for pixels adjacent to the center pixel. The directional tap for the pixel on the gradient location is also determined by multiplying the on-gradient coefficient with a corresponding attenuation factor obtained from the normalized pixel difference value between the center pixel and that pixel, the on-gradient slope value and the on-gradient knee value.

Third, if a pixel is not on an edge nor on gradient, coefficient processor 514 uses an off-edge coefficient to determine the directional tap for this pixel. There are two different off-edge coefficients, one for corner pixels and the other for pixels adjacent to the center pixel. A corresponding attenuation factor is also determined as a value mapped to a curve (defined by an off-edge knee value and an off-edge slope value) to a normalized difference between pixel values. There are also two combinations of off-edge slope value and off-edge knee value, one for corner pixels and the other for pixels adjacent to the center pixel. The directional tap for the pixel neither on the edge nor on the gradient portion is determined by multiplying the off-edge coefficient with corresponding attenuation factor obtained from the normalized pixel difference value between the center pixel and that pixel, the off-edge slope value and the off-edge knee value.

If the confidence value w is somewhere between the highest value (e.g., 1) and the lowest value (e.g., 0), the final taps are obtained by blending the directional taps and the non-directional taps. The confidence value w operates as a weighing factor that gives a higher weight to the directional taps as the confidence value increases. The following is one example way of determining the final tap value:

$$\text{Final tap} = w \times \text{directional-tap} + (1-w) \times \text{non-directional tap} \quad (7)$$

The center pixel has the same coefficient regardless of the directionality of the pixel block. The final tap for the center pixel is the same as the coefficient value for the center pixel without attenuation.

Example Directional Pixel Block Arrangements

Figure 8A:
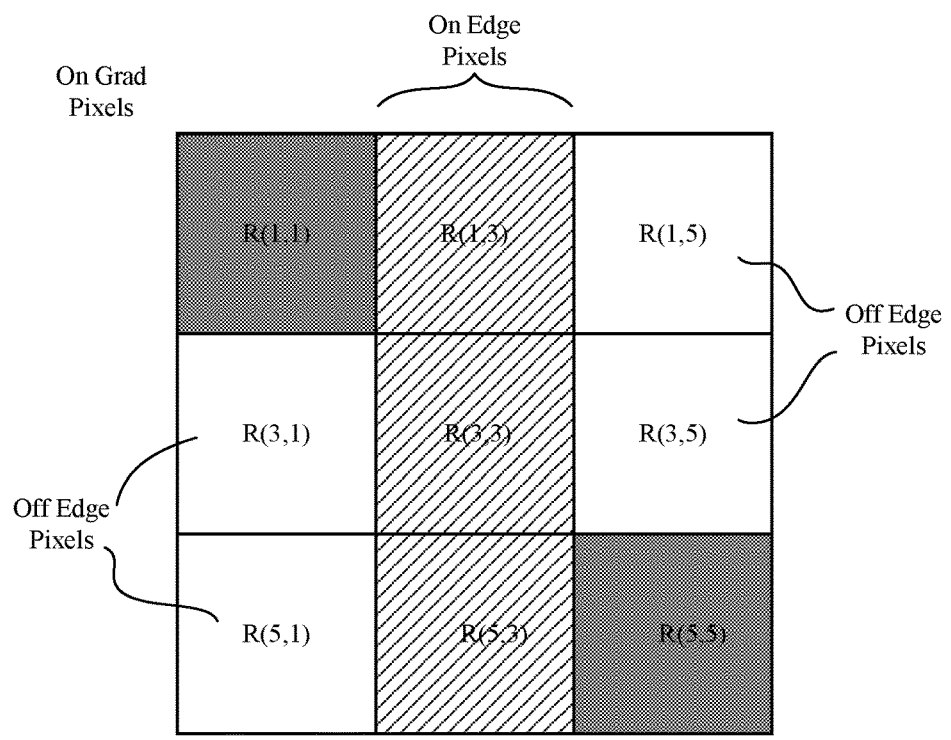
FIGS. 8A through 8C are diagrams illustrating red pixels with different edge directionality and gradient locations, according to one embodiment.
Figure 8B:
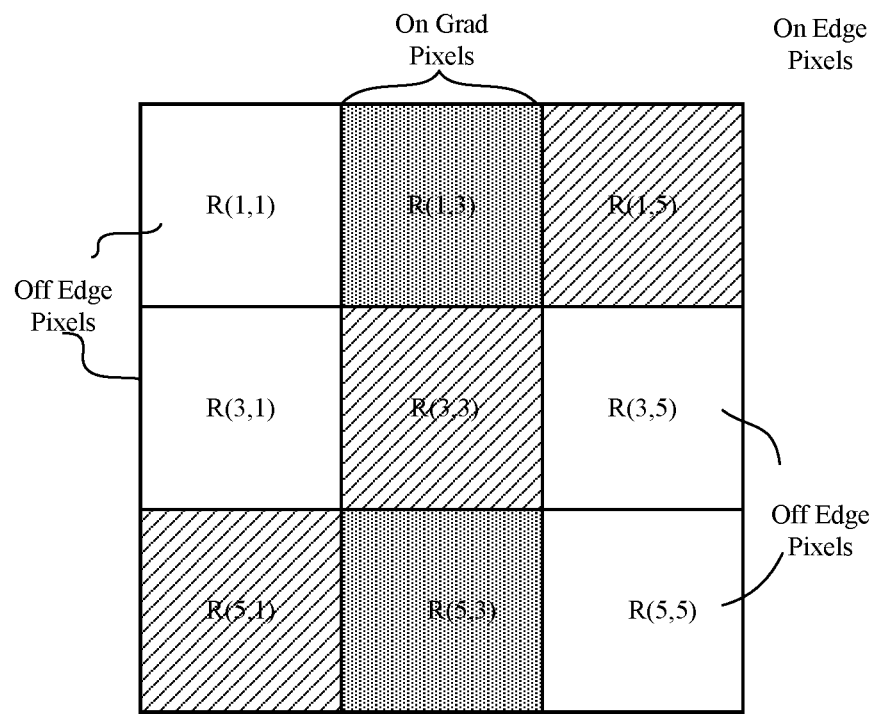
Figure 8C:
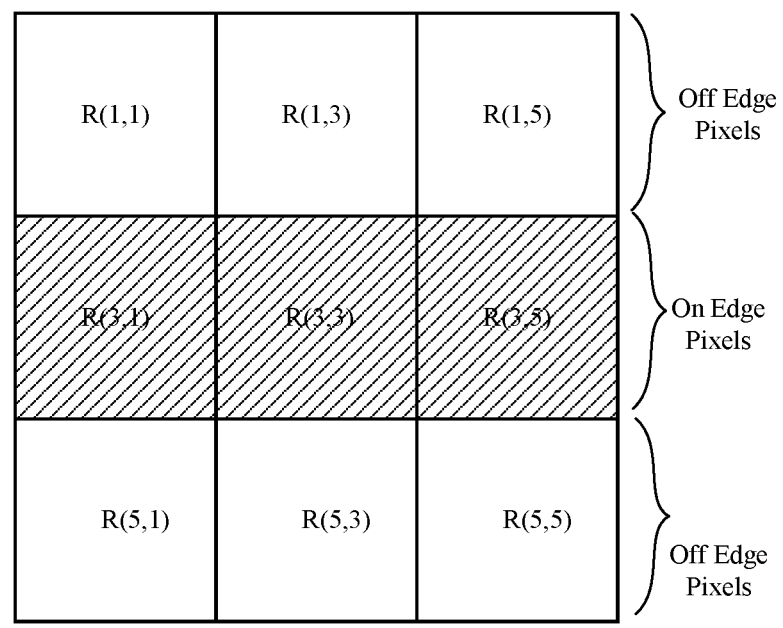

FIGS. 8A through 8C are diagrams illustrating sets of red pixels with different edge directions, according to embodiments. In FIG. 8A, the edge direction is vertical. Therefore, pixels R(1,3) and R(5,3) are on the edge while remaining red pixels are not on the edge. Hence, on-edge coefficients, on-edge slope values and on-edge knee values are used to determine directional taps for pixels R(1,3) and R(5,3). In the example of FIG. 8A, on gradient is detected across pixels R(1,1), R(3,3) and R(5,5). Therefore, on-gradient coefficients, on-gradient slope values and on-gradient knee values are used to determine directional taps for pixels R(1,1) and R(5,5). A gradient change below a threshold is not detected in other directions, and therefore, off-edge coefficients, off-edge slope values and off-edge knee values are used to determine directional taps for pixels R(1,5), R(3,1), R(3,5) and R(5,1).

In FIG. 8B, the edge direction is upward diagonal with pixels R(1,3) and R(5,3) being on gradient. For pixels R(5,1) and R(1,5), on-edge coefficients, on-edge slope values and on-edge knee values are used to determine their directional taps. For pixels R(1,3) and R(5,3) on-gradient coefficients, on-gradient slope values and on-gradient knee values are used to determine their directional taps. For pixels R(1,1), R(3,1), R(3,5) and R(5,5), off-edge coefficients, off-edge slope values and off-edge knee values are used to determine their directional taps.

FIG. 8C illustrates a pixel block where the edge is along a horizontal direction, according to one embodiment. Therefore, for pixels R(3,1) and R(3,5), on-edge coefficients, on-edge slope values and on-edge knee values are used to determine directional taps for these pixels. No gradual gradient change is detected in the three top pixels and three bottom pixels, and therefore, off-edge coefficients, off-edge slope values and off-edge knee values are used for pixels R(1,1), R(1,3), R(1,5), R(5,1), R(5,3) and R(5,5) to determine their directional taps.

Figure 9:
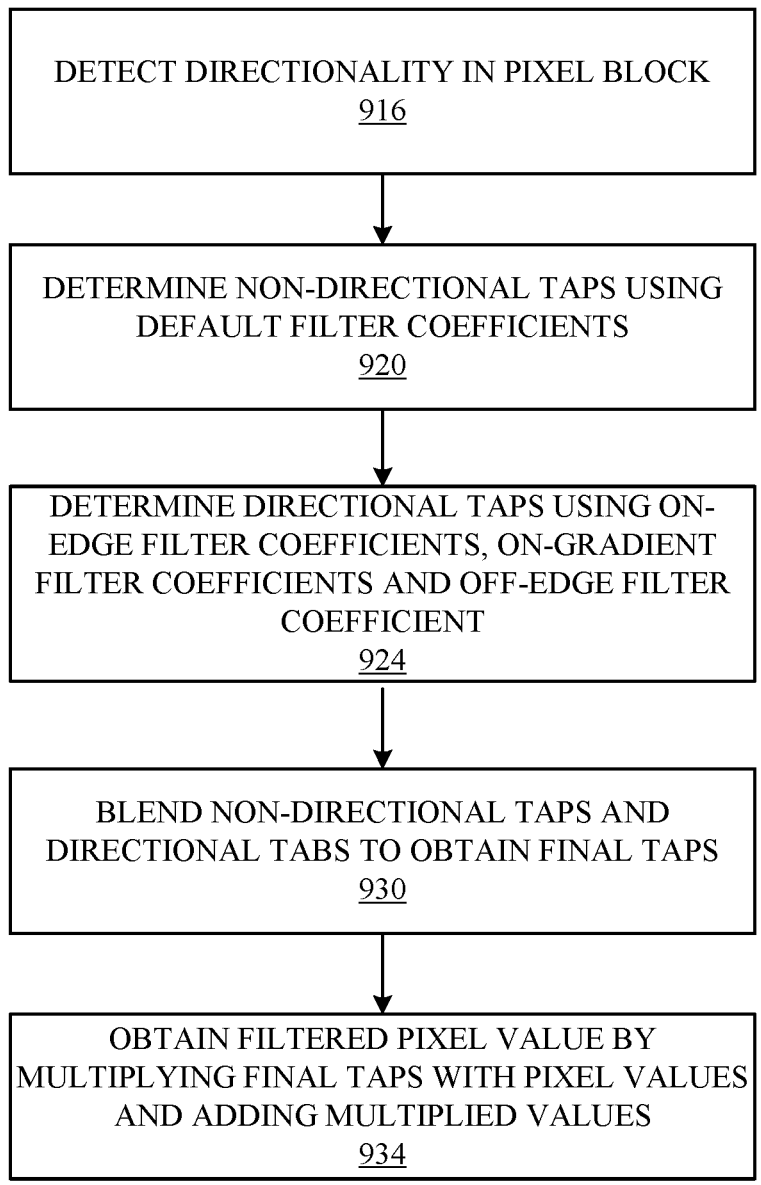
FIG. 9 is a flowchart illustrating a method of performing directional bilateral filtering, according to one embodiment.

The above examples of FIGS. 8A through 8C are merely illustrative, and pixel blocks with different directionality and gradient profile may be processed using different sets of coefficients, slope values and knee values according to embodiments described herein. Example Method of Performing Directional Bilateral Filtering FIG. 9 is a flowchart illustrating a method of performing directional bilateral filtering, according to one embodiment. First, directionality in a pixel block is detected 916 by determining directional energies and comparing them. A confidence value w may also be obtained based at least on the energies. Non-directional taps for pixels of the same color are obtained 920 using default filter coefficients. A default slope value and a default knee value may also be used to determine attenuation factors associated with the non-directional taps. If the confidence value is the lowest, these non-directional taps are used as the final taps, and the process proceeds directly to process 934 of obtaining a filtered pixel value.

Otherwise, directional taps are obtained 924 by using on-edge filter coefficients, on-gradient filter coefficients, and/or off-edge filter coefficients. Corresponding knee values and slope values are also used to determine attenuation factors associated with the directional taps. If confidence value is the highest, these directional taps are used as the final taps, and the process proceeds directly to process 934 of obtaining a filtered pixel value.

If confidence value w is not the highest or the lowest, the directional taps and the non-directional taps are blended 930 to obtain the final taps.

A filtered pixel value is obtained 934 by multiplying the final taps with corresponding pixel values, and then adding these multiplied values. The process is repeated for all pixels.

The processes described above with reference to FIG. 9 is merely illustrative. One or more of the processes may be omitted, and the processes may be performed in a difference sequence or in parallel. For example, the determining 920 of non-directional taps and the determining 924 of directional taps may be performed in a reverse order or in parallel.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for processing an image, comprising:
    a bilateral filter circuit configured to:
        determine whether a block of pixels in a raw image has directionality, the block of pixels including pixels of multiple colors;
        determine, responsive to determining that the block of pixels has the directionality, taps for pixels of a same color in the block by processing directional filter coefficients corresponding to the directionality and a location of each pixel within the block; and
        obtain each of pixel values of a filtered raw image by multiplying the taps to corresponding pixel values in the pixels of the same color and adding the multiplied values; and
    a demosaicing circuit configured to perform demosaicing on a version of the filtered raw image.

2. The apparatus of claim 1, wherein the bilateral filter is further configured to determine non-directional taps by processing default filter coefficients, responsive to determining that the block of pixels has no directionality.

3. The apparatus of claim 2, wherein the bilateral filter is further configured to determine a confidence value representing confidence in the directionality, and wherein the taps are determined by blending, using the confidence value as a weighting factor, the non-directional taps and directional taps derived from the directional filter coefficients.

4. The apparatus of claim 1, wherein the bilateral filter circuit is further configured to detect (i) an edge in the block or (ii) locations along a direction in which a gradient change is below a threshold.

5. The apparatus of claim 4, wherein a directional filter coefficient for each pixel is one selected from (i) an on-edge coefficient indicating that the pixel is on the edge, (ii) an on-gradient coefficient indicating that the pixel is not on the edge but along the direction in which the gradient change is below a threshold or (iii) an off-edge coefficient indicating that the pixel is not on the edge and not along the direction in which the gradient change is below the threshold.

6. The apparatus of claim 5, wherein each of the taps is obtained by multiplying a corresponding attenuating factor to the directional filter coefficient, wherein the attenuation factor is determined by at least a corresponding curve, a location of each pixel in the block and pixel value differences.

7. The apparatus of claim 1, wherein the bilateral filter circuit is further configured to:
determine the directionality by at least determining energies each of which is derived from pixel value differences of pixels along a plurality of directions; and
select an energy with a lowest value as indicating the directionality.

8. A method for processing an image, comprising:
determining whether a block of pixels in a raw image has directionality, the block of pixels including pixels of multiple colors;
determining, responsive to determining that the block of pixels has the directionality, taps for pixels of a same color in the block by processing directional filter coefficients corresponding to the directionality and a location of each pixel within the block;
obtaining each of pixel values of a filtered raw image by multiplying the taps to corresponding pixel values in the pixels of the same color and adding the multiplied values; and
demosaicing of a version of the filtered raw image.

9. The method of claim 8, further comprising determining non-directional taps by processing default filter coefficients, responsive to determining that the block of pixels has no directionality.

10. The method of claim 9, further comprising determining a confidence value representing confidence in the directionality, and wherein the taps are determined by blending, using the confidence value as a weighting factor, the non-directional taps and directional taps derived from the directional filter coefficients.

11. The method of claim 8, further comprising detecting (i) an edge or (ii) locations along a direction in which a gradient change is below a threshold.

12. The method of claim 11, further comprising selecting one from (i) an on-edge coefficient indicating that the pixel is on the edge, (ii) an on-gradient coefficient indicating that the pixel is not on the edge but along the direction in which the gradient change is below a threshold or (iii) an off-edge coefficient indicating that the pixel is not on the edge and not along the direction in which the gradient change is below the threshold.

13. The method of claim 12, wherein each of the taps is obtained by multiplying a corresponding attenuating factor to the directional filter coefficient, wherein the attenuation factor is determined by at least a corresponding curve, a location of each pixel in the block and pixel value differences.

14. The method of claim 8, wherein the directionality of the raw image is determined by
determining energies each of which is derived from pixel value differences of pixels along a plurality of directions; and
selecting an energy with a lowest value as indicating the directionality.

15. An imaging system, comprising:
an image capturing device configured to capture a raw image;
a bilateral filter circuit configured to:
determine whether a block of pixels in the raw image has directionality, the block of pixels including pixels of multiple colors;
determine, responsive to determining that the block of pixels has the directionality, taps for pixels of a same color in the block by processing directional filter coefficients corresponding to the directionality and a location of each pixel within the block; and
obtain each of pixel values of a filtered raw image by multiplying the taps to corresponding pixel values in the pixels of the same color and adding the multiplied values; and
a demosaicing circuit configured to perform demosaicing on a version of the filtered raw image.

16. The system of claim 15, wherein the bilateral filter is further configured to determine non-directional taps by processing default filter coefficients, responsive to determining that the block of pixels has no directionality.

17. The system of claim 16, wherein the bilateral filter is further configured to determine a confidence value representing confidence in the directionality, and wherein the taps are determined by blending, using the confidence value as a weighting factor, the non-directional taps and directional taps derived from the directional filter coefficients.

18. The system of claim 15, wherein the bilateral filter circuit is further configured to detect (i) an edge in the block or (ii) locations along a direction in which a gradient change is below a threshold.

19. The system of claim 18, wherein a directional filter coefficient for each pixel is one selected from (i) an on-edge coefficient indicating that the pixel is on the edge, (ii) an on-gradient coefficient indicating that the pixel is not on the edge but along the direction in which the gradient change is below the threshold or (iii) an off-edge coefficient indicating that the pixel is not on the edge and not along the direction in which the gradient change is below the threshold.

20. The system of claim 19, wherein each of the taps is obtained by multiplying a corresponding attenuating factor to the directional filter coefficient, wherein the attenuation factor is determined by at least a corresponding curve, a location of each pixel in the block and pixel value differences.

* * * * *